United States Patent [19]

Popkin

[11] 4,121,054
[45] Oct. 17, 1978

[54] REGENERATIVE LINE ACCESS MODULE

[75] Inventor: Philip Popkin, Orlando, Fla.

[73] Assignee: Martin Marietta Corporation, Orlando, Fla.

[21] Appl. No.: 756,194

[22] Filed: Jan. 3, 1977

[51] Int. Cl.$^2$ .............................................. H04J 3/08
[52] U.S. Cl. .......................... 179/15 BD; 179/15 BF
[58] Field of Search ........ 179/15 BD, 15 AL, 15 BF, 179/15 A, 175.35; 178/2 C, 58 R, 58 A, 59, 69 R, 69 G; 343/175, 177; 333/7 R, 7 D, 8, 22 R; 325/38 A; 340/347

[56] References Cited

U.S. PATENT DOCUMENTS

| | | | |
|---|---|---|---|
| 3,838,416 | 9/1974 | Brown | 179/15 BD |
| 3,993,953 | 11/1976 | Lender | 325/38 A |
| 4,029,907 | 6/1977 | Jorgensen | 179/16 EA |

Primary Examiner—David L. Stewart
Attorney, Agent, or Firm—Julian C. Renfro; Gay Chin

[57] ABSTRACT

A device for permanent installation in series with a time division multiplex digital data transmission line for accessing data signals carried by the line without interruption or degradation of the signals. This novel device is a regenerative line access module (RLAM) that receives incoming data signals that may be attenuated and distorted, and regenerates or reshapes the pulses thereof. The regenerated signals are passed to the output of the RLAM, amplified, and retransmitted on the transmission line, and are also used for generating a clock signal having a fundamental signal equal in frequency to the fundamental frequency of the incoming data signals but delayed slightly therefrom. When it is desired to access a selected subscriber channel, the RLAM blocks the throughput of the incoming bit stream during the period of the selected subscriber data byte. The data byte thus deleted may be dropped for local use if desired. The delay in the outgoing bit stream provides time for the recognition and deletion of the selected byte, and for the generation and insertion of a locally generated substitute byte. A principal application of the RLAM is as an element in a test system for verifying the integrity of individual subscriber channels of the digital data bit stream, and the substitued bytes may be test codes to determine channel characteristics. Through the use of a duplex arrangement having a RLAM in both the SEND and RECEIVE transmission lines, the response to the inserted test code data in the SEND line can be extracted from the RECEIVE line by means of a loopback connection, and analysis of the received code provides the required test data. Importantly, the accessing of an individual channel of the data bit stream is accomplished without interruption or degradation of the other subscriber channels.

12 Claims, 9 Drawing Figures

REGENERATIVE LINE ACCESS MODULE

BACKGROUND OF THE INVENTION

1. Field of the Invention

The present invention generally relates to time division multiplex (TDM) data transmission systems, and more particularly to a device for selectively obtaining access to individual channels of a TDM bit stream without de-multiplexing thereof, principally to allow testing of such channels.

2. Description of the Prior Art

This invention is related to my copending application "Line Access Module," Ser. No. 725,308 filed Sept. 21, 1976, the pertinent content of which is incorporated into this application by reference.

In the operation of digital transmission systems, it is the practice to multiplex large numbers of subscriber data channels into one high-speed digital bit stream and to transmit the bit stream over various transmission media such as cable and radio. Normally, the bit stream may pass through central offices, relay terminals, and transmission equipment with de-multiplexing of the bit stream being necessary. However, to assure the proper operation of the subscriber end equipment and transmission paths, it is necessary to selectively monitor and periodically test subscriber equipment from central offices.

Prior art subscriber channel testing has been limited to points at which physical access to the individual subscriber lines is possible. In this practice, demultiplex equipment is necessary, manual connections of test equipment to each line to be tested is required, and time-consuming research of network and routing records is required to determine the location of the access points.

One version of a line access module (LAM) to provide convenient access to individual subscriber channels of a high speed TDM data transmission line has been disclosed in the above referenced invention. The LAM described operates in an analog mode and therefore requires external regenerative circuitry when in an active line access condition.

SUMMARY OF THE INVENTION

The present invention is basically a digital device installable in series relation in the digital data transmission system which is carrying a time division multiplex data bit stream, and will allow access to any individual subscriber channel of the bit stream. Termed a regenerative line access module (RLAM), the device normally receives the data bit stream, detects and regenerates the data, and outputs the data bit stream onto the outgoing transmission line. When access is desired to a selected channel, the RLAM is connected to external common electronic circuits. The bit stream is monitored, the selected channel is identified, and the incoming data in that channel is deleted. Locally generated data, such as test codes, are then inserted in lieu thereof and transmitted on the outgoing transmission line. Thus, one bit stream leaving the RLAM represents the incoming bit stream with only the data of the selected channel changed. The data contents of the remainder of the channels are unaffected by this operation.

For use with duplex transmission lines, a RLAM is installed in both the SEND and RECEIVE lines, allowing loopback testing to be performed. The transition between throughput data and locally generated data or test codes is accomplished in accordance with this invention without degradation of the digital data stream, and the invention provides for proper line termination in both directions. The basic design of the RLAM permits common circuitry to operate in conjunction with multiple duplex RLAMs, each of which is installed in a duplex transmission line.

In its basic configuration, each half of a duplex RLAM processes data in a given direction. One half of a duplex RLAM, viewed in the direction of data flow, may include a first coupling circuit, a comparator, a clock generator, a data storage flipflop, gating circuits, polarity control circuitry and a second coupling circuit connected to the outgoing transmission line. Also included is a relay which permits the terminals of a specific one of a group of multiple duplex RLAMs to be controlled when the selected RLAM is to be accessed by external common equipment. The relay also permits connection of the external common equipment to the comparator output for monitoring purposes.

The data storage flipflop and gating circuits function most advantageously to provide delay of data signals so that input data may be detected and insert data generated without a time displacement error due to the transit time of the data signals through the detection and generation circuits.

In normal throughput operation of a data transmission system employing a RLAM, a relay is nonoperated. Incoming data signals of the 50 percent duty cycle bipolar type which may have been attenuated and distorted during transmission are regenerated in the comparator circuit and converted to a unipolar type signal. A timing extraction circuit filters out the fundamental sinusoidal component of the regenerated unipolar signal and generates a square wave clock signal therefrom. The unipolar signal drives the stored data flipflop under control of the derived clock signal. From the flipflop, the signal passes through the gating circuit to the polarity control circuit that reproduces the original bipolar signal for output. When it is desired to access a specific subscriber channel the control relay is operated, connecting various circuit elements of the RLAM to external common electronic circuits, which may include a computer or a microprocessor programmed to recognize specific subscriber data bytes (groups of data bits). The regenerated incoming signal in unipolar format is monitored by the common electronic circuits. When the desired channel is recognized, an insert data byte is generated along with a gating signal. The gating signal causes the slightly delayed incoming data byte on that channel to be blocked and the locally generated insert data byte to be inserted in the outgoing data stream in its place. At the termination of the gating signal, the incoming data signals again are passed through the gating circuitry without modification.

It is therefore a principal object of the present invention to provide a regenerative line access device whereby an individual subscriber channel can be electrically accessed when the channel is one of the multiplicity of time division multiplexed channels in a digital bit stream and without disturbing the data on other channels of the bit stream.

It is another object of the present invention to provide a regenerative line access module that involves a throughput mode and data insert mode.

It is still another object of the present invention to provide a regenerative line access module that can be permanently installed in a digital data transmission line and that will receive attenuated and distorted data signals and will output regenerated data signals.

It is yet another object of the present invention to provide a RLAM connected in a digital data transmission line that will regenerate incoming data signals, allow recognition of a specific subscriber channel, delete incoming data in such channel, and substitute locally generated data therefor, accomplished without disturbance to other subscriber data.

It is still yet another object of the present invention to provide a RLAM such that a multiplicity of RLAMs can be connected in a multiplicity of digital data transmission lines whereby all of such RLAMs can utilize a single external common electronics section.

It is a further object of the present invention to provide a RLAM whereby an individual subscriber channel of a TDM bit stream can be electrically accessed and test code data substituted for the subscriber's incoming data to allow the subscriber equipment to be rapidly and economically tested without disturbance to other subscribers on the same bit stream.

These and other objects, applications and advantages of the invention will become apparent from the following detailed description and form the accompanying drawings.

DETAILED DESCRIPTION OF THE PREFERRED EMBODIMENT

Before describing the preferred embodiment of the regenerative line access module (RLAM), a brief review will be presented of a typical time division multiplex (TDM) data transmission system in which the invention is advantageously used. A more detailed description of the application of line access modules will be found in my previously referenced copending application Ser. No. 725,308 filed Sept. 21, 1976, in which an analog non-regenerative line access module is disclosed.

TDM data transmission systems carry a multiplicity of subscriber channels arranged sequentially in time in a data bit stream. For example, in a T1 carrier system, 460 subscribers generating data at 2.4 kilobits per second (kb/s) can be accommodated. The data format consists of a major frame having 460 8-bit data bytes in sequence, with each byte occupying a time frame designated for the subscriber generating the byte. The major frame includes overhead or housekeeping bits to permit recognition and location of the specific subscriber bytes. The data bit stream is generated by multiplexers which accept the data from each individual subscriber and combine the multiple inputs into a single output. At the destination of the transmission system, a demultiplexer performs the inverse operation and separates the single transmission bit stream into its separate subscriber channels. Generally, such TDM transmission systems are duplex with transmission in both directions.

In the prior art, access to an individual subscriber channel for testing or for drop and insert purposes has necessitated complete multiplex-demultiplex equipment. Testing has been generally performed by manual access to the subscriber loop and often requires interruption of that subscriber's communication.

The T1 data transmission system utilizes 50% duty cycle bipolar data transmission with a MARK being either a positive voltage or a negative voltage for the first half of a bit period and zero voltage for the second half. Successive MARKs alternate between positive-going and negative-going halfpulses. A SPACE is represented by zero voltage for the entire bit.

Figure 1:
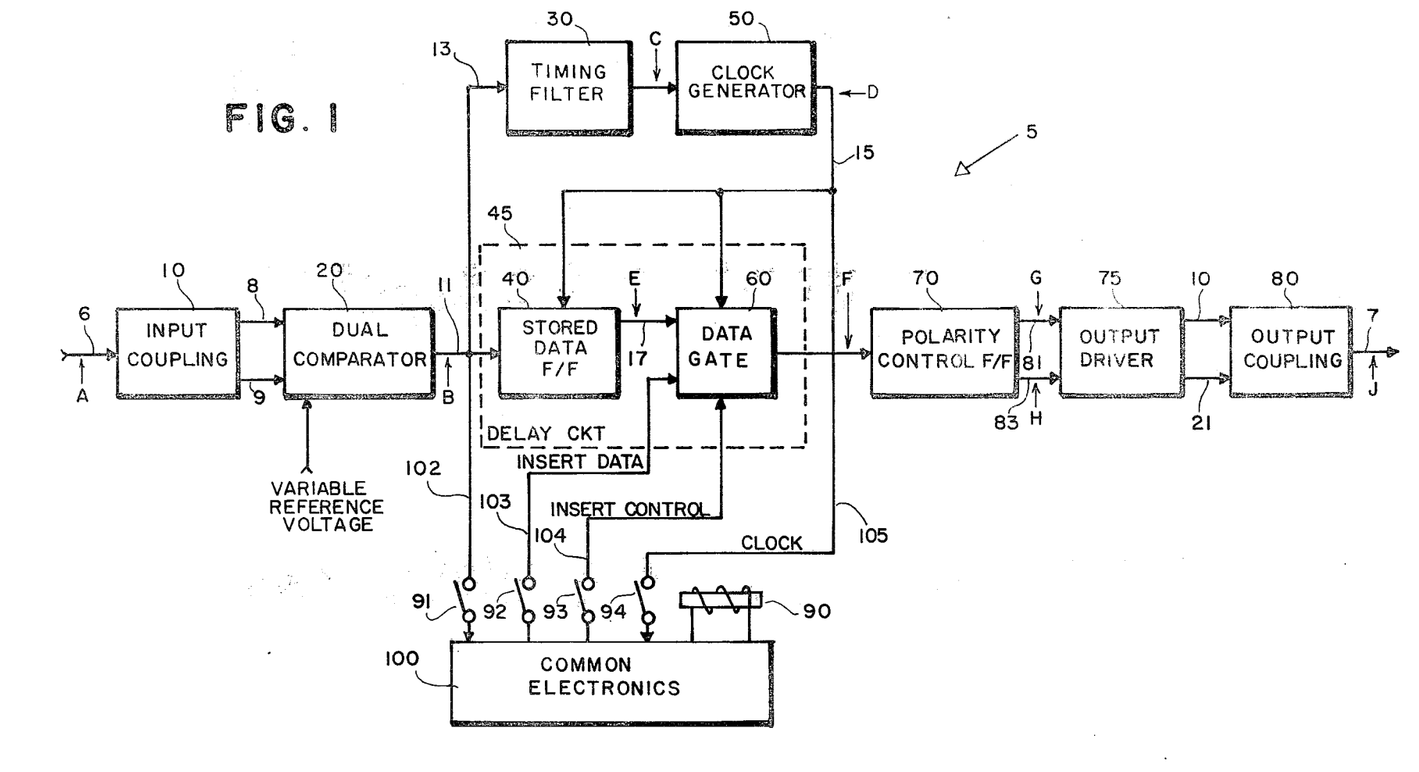
FIG. 1 is a functional block diagram of the regenerative line access module.
Figure 2:
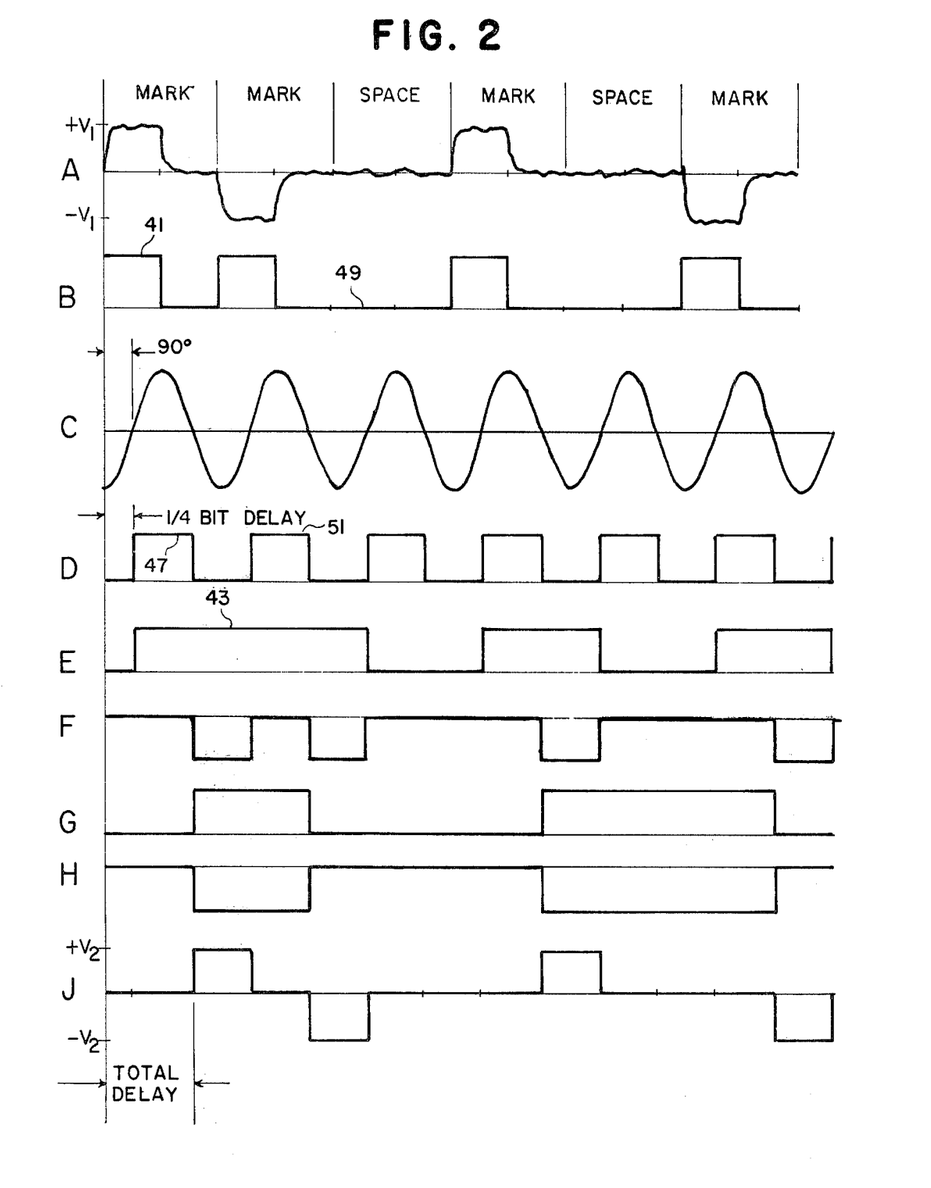
FIG. 2 illustrates typical waveforms which may be found at various points in the block diagram of FIG. 1.

The RLAM is installed in a TDM data transmission line and advantageously provides direct access to any desired individual channel subscriber. Turning now to FIG. 1, a block diagram is shown for a preferred embodiment of the RLAM installed in series relationship to a T1 transmission line, and typical waveforms at several points in the block diagram are shown in FIG. 2. A TDM bit stream is assumed present at the input on lead 6 and, as shown in line A of FIG. 2. The bipolar data pulses may be attenuated and slightly distorted at this point. Input coupling circuit 10 provides correct termination of the transmission lines as well as push-pull coupling to dual comparator 20 via leads 8 and 9. It is to be understood that the push-pull connection causes the signals on leads 8 and 9 to be 180° out of phase.

Dual comparator 20 has a selected reference threshold voltage provided thereto such that a logic ONE output is generated on lead 11 when the input signal voltage exceeds the reference voltage, and a logic ZERO output when the signal level is less than the reference voltage. A typical input signal as shown on line A of FIG. 2 will have its positive-going MARK pulses at an amplitude of $+V_1$ and its negative-going MARK pulse at an amplitude of $-V_1$. The magnitude of $V_1$ is, of course, determined by the transmission line attenuation to the point of installation of the RLAM. The reference threshold voltage is preferably selected at approximately one-half of $V_1$ to provide optimum decision. The reference threshold voltage is preferably determined automatically by peak detecting the incoming signal and deriving the optimum threshold therefrom. Due to the push-pull nature of the inputs to dual comparator 20, both positive and negative-going MARKS generate positive-going logic ONEs on lead 11 as shown on line B of FIG. 2. This signal therefore represents a regenerated unipolar version of the input signal of line A.

The signal on lead 11 (line B) is conducted by lead 13 to a clock pulse generating circuit formed by timing filter 30 and clock generator 50. As indicated by line C of FIG. 2, timing filter 30 extracts the fundamental frequency of the incoming bit stream with the zero-crossings shifted in phase 90°, which is one-fourth of a bit period. Clock generator 50 responds to the sinusoidal timing signal (line C) by producing a square-wave clock signal on lead 15 as shown in line D of FIG. 2.

The regenerated unipolar signal (line B) also is input to stored data flipflop 40 which serves to temporarily store the incoming signal to be read out by the clock pulses on lead 15. The presence of a ONE on lead 11 such as pulse 41 (line B) results in setting of flipflop 40 by clock pulse 47 generating a ONE logic level 43 appearing on lead 17 (line E). Flipflop 40 is reset only by the next positive-going clock pulse 51 which is coincident with a ZERO level 49 on its input lead 11. The resulting signal on lead 17 (line E) is next applied to two-stage gate 60 which may pass the signal through to its output in one state and block the signal when in its other state. In the throughput state the resulting output signal appears delayed by one-quarter bit, thus flipflop 40 and data gate 60 together may be considered to form delay circuit 45 in accordance with the invention.

Figure 5:
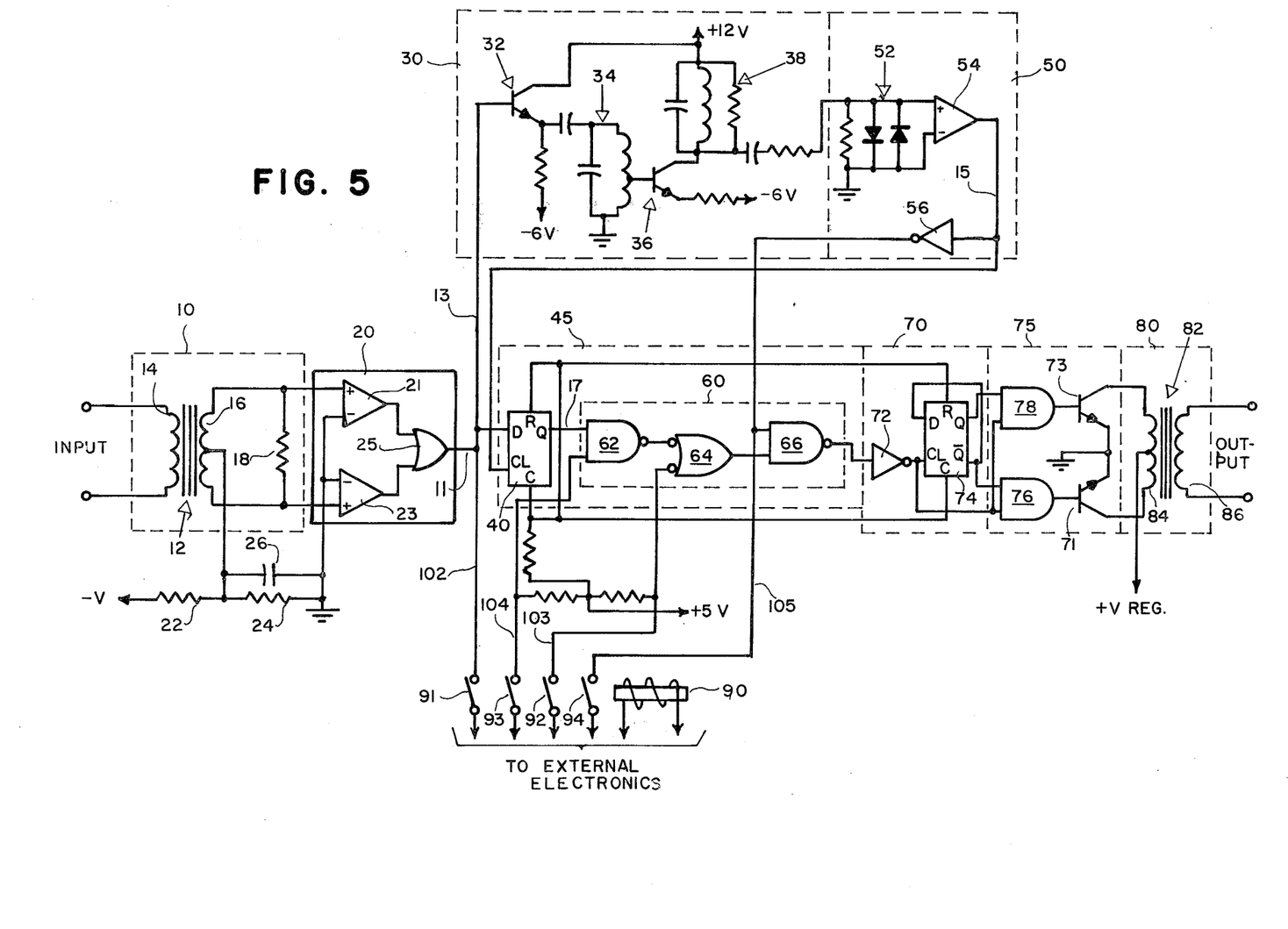
FIG. 5 is a schematic diagram of a preferred embodiment of RLAM.

Data gate 60 involves three series gating circuits as will be described with reference to FIG. 5 below. The action of data gate 60 and clock signal of line D produces the signal of line F at its output when the data gate 60 is in the throughput state. It will be seen that the signal of line F is an inverted and delayed version of the regenerated unipolar signal shown on line B.

In accordance with the invention, signals arriving at the input of the RLAM may be transmitted through to the output except for selected segments or bytes of the data in each frame. Therefore, data gate 60 is maintained in its conducting state to signals on lead 17 normally, and placed in its non-conducting state only when the data signals on lead 17 are to be deleted from the out-going bit stream as will be described in detail below.

The signal shown on line F will be applied to polarity control flip-flop 70 which drives output driver 75 in push-pull fashion. Driver 75 has a push-pull output on leads 19 and 21. In response to the signals on line F, polarity control flipflop 70 generates positive-going pulses on lead 81 as shown on line G, and negative-going pulses on lead 83 as shown on line H. Output driver 75 and output coupling circuit 80 combine these push-pull input signals to produce the composite output signal on lead 7 (line J) with an additional one-half bit delay and amplitudes $+V_2$ and $-V_2$.

As should now be understood, the attenuated and distorted input signal on lead 6 is throughput by the RLAM to output lead 7 and regenerated to a clean, full-amplitude 50% duty-cycle bipolar signal. As may be noted from FIG. 2, the output signal is delayed by three-fourths of a bit period. As mentioned above, it is required on occasion to delete certain selected data in the incoming bit stream and to substitute therefor locally generated data. To this end, the invention provides an interface with external common electronics circuits to control the RLAM for this purpose. A multi-contact relay 90 serves to connect the RLAM via its contacts 91-94 to the common electronics. Since contacts 91-94 are open in FIG. 1, all input signals will be throughput.

The delete/insert function will be explained with reference to FIG. 3, FIG. 4 and FIG. 1. Common electronics 100 of FIG. 1 may include control circuits, computer circuits and logic circuits, with the functions of each of these circuits being indicated in FIG. 3. When it is required to delete specific subscriber bytes from the incoming bit stream and to insert locally generated data, relay 90 is operated, either manually or under computer control. Such control is indicated by control circuit 102. When relay 90 is operated contacts 91-94 are closed performing the following functions:

1. Contact 91 connects lead 102 from dual comparator 20 (FIG. 1) to delete data detector 106.
 2. Contact 92 connects the output of insert data generator 108 to one input of data gate 60 (FIG. 1).
 3. Contact 93 connects the output of gating pulse generator 107 to the control lead 104 of data gate 60 (FIG. 1).
 4. Contact 94 connects the square wave clock signal on lead 105 to gating pulse generator 107.

Figure 3:
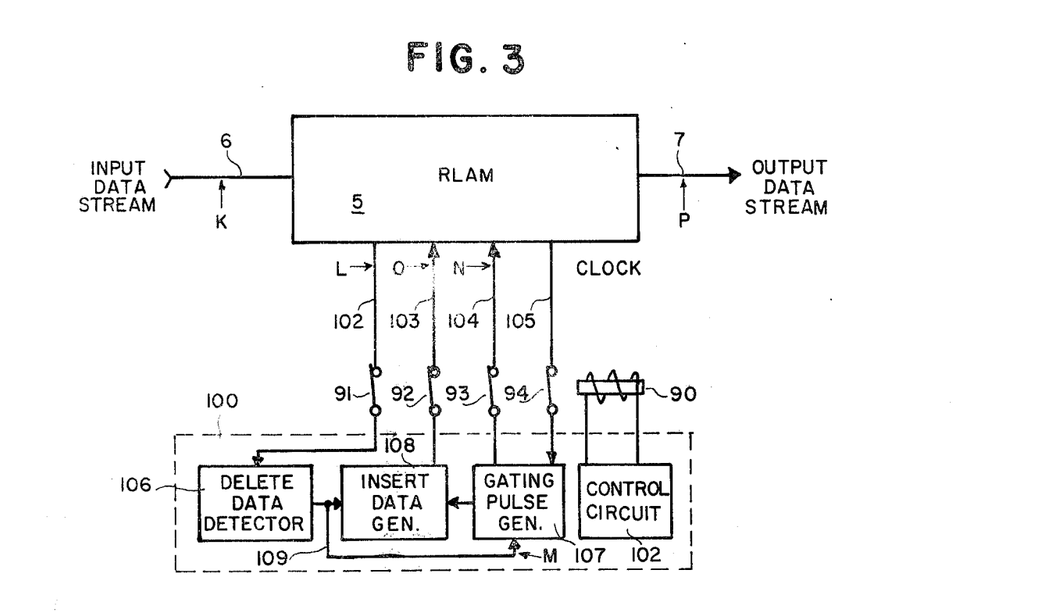
FIG. 3 is a simplified block diagram of the RLAM showing the configuration of a typical common electronics section.
Figure 4:
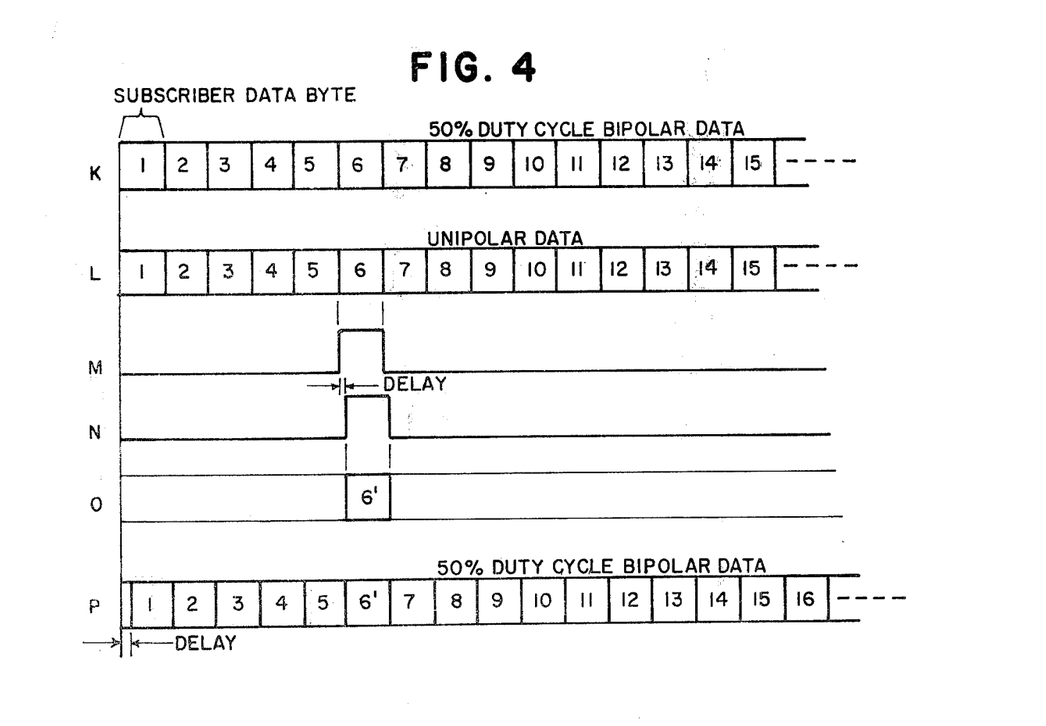
FIG. 4 is a diagram illustrating a set of subscriber data bytes which may be found at various points in the block diagram of FIG. 3, and showing the substitution of a locally generated data byte form of the incoming subscriber data byte.

FIG. 4 shows a portion of an incoming data signal at various key points in the block diagram of FIG. 3. Line K represents a portion of a major frame of the incoming bit stream on input lead 6 of RLAM 5. Line L represents the regenerated unipolar data output of comparator 20 (FIG. 1) appearing at delete data detector 106. Line P represents the output data at RLAM output lead 7. Data gate 60 (FIG. 1) will pass the regenerated unipolar data of line L when there is no gating signal present on lead 104 and will block the regenerated unipolar data when a gating signal occurs. At such time, data on lead 103 will be passed to the output lead 7 in place of the blocked data.

Returning now to FIG. 3, the manner in which selected subscriber data bytes are deleted and locally generated bytes substitued therefor will be described. In this figure, relay 90 is assumed to be closed by control circuit 102. The unipolar data of line L (FIG. 4) appears at delete data detector 106. Assume that access to subscriber #6 is desired. When the location of byte 6 is recognized, a pulse is generated on lead 109 as shown on line M. It is pertinent to mention at this point that the position of any data byte is known from the framing format and coding arrangement. Accordingly, delete data detector 106 may be a computer programmed to detect the framing pattern and sync code of the desired subscriber. Alternatively, hardwired logic circuits and microprocessors may be used for this purpose. The pulse generated on lead 109 initiates the generation of a data byte by insert data generator 108, and also causes gating pulse generator 107 to produce a gating pulse on lead 104. The gating pulse is clocked out by the clock pulses on lead 105 with a delay as shown on line N. The gating pulse also causes insert data generator 108 to produce the desired new byte 6' as shown on line O and to output byte 6' onto lead 103.

The presence of the gating pulse, which has a one byte duration, on lead 104 operates data gate 60 as previously discussed, blocking incoming byte 6 and passing new insert data byte 6' to the output of RLAM 5. The composite output signal on lead 7 is shown on line P. As may now be understood, bytes 1 through 5 are throughput, byte 6 is deleted and new byte 6' inserted, and the remainder of the bytes from the other subscriber throughput without modification.

The functional operation of the RLAM having been explained above, the electrical operation will now be described. FIG. 5 is a schematic diagram of a preferred embodiment of the invention. Input coupling 10 includes unity turns-radio transformer 12 and termination resistor 18. The incoming data transmission line, carrying for example 1.544 megabit per second (Mb/s) 50 percent duty cycle bipolar data is connected to the primary winding 14 of transformer 12. Resistor 18 across secondary winding 16 of transformer 12 is selected to be equal to the characteristic impedance of the incoming transmission line, thereby properly terminating the line to prevent reflection of the data signals. The center tap of transformer winding 16 is connected to a voltage divider formed by resistors 22 and 24 for dc, and maintained at ground potential to ac by capacitor 26. The dc voltage at the center tap is selectable to be proportional to the peak voltage of the incoming signal.

Comparator 20 is a dual comparator device and may be a Fairchild μ 711 IC with the positive input of first comparator 21 and the positive input of second comparator 23 connected across resistor 18 to receive the data signal inputs from the center tapped secondary 16 of transformer 12. The negative terminals of comparators 21 and 23 are grounded. As will be recognized, the negative dc voltage applied to the center tap of winding 16 will determine a threshold voltage at which voltage the comparators will produce a logic ONE output. The outputs of comparators 21 and 23 are internally connected in dual comparator 20 to an OR gate 25 with the output therefrom appearing on lead 11. The signal on lead 11 is a unipolar waveform such as shown on line B of FIG. 2 representing a regenerated version of the input signal.

The signal on lead 11 is input to timing filter 30 via transistor amplifiers 32 and 36. Tuned circuit 34 is a sharply tuned load circuit for the amplifier 32 and serves to extract a sinusoidal fundamental clock signal from the signal with the phase of this waveform being shifted by 90 degrees from the unipolar signal pulses. Tuned circuit 38 is a low-Q load for amplifier 36. Diode clipper circuit 52 and comparator 54 in clock generator 50 produce square waves from the sinusoidal signal output from timing filter 30. The output on lead 15 is utilized as the clock signal.

The signal lead 11 is also connected to the D input of delay flipflop 40. A digital ONE appearing at the D input is clocked out at the Q terminal one-half a pulse width later by the clock pulse applied to the CL input of flipflop 40. Therefore, the leading edge of a pulse on lead 11 is delayed about one-quarter of a bit period in accordance with the invention. The delayed logic ONE level signal from the Q output is applied to one input of gate 62. Assume that lead 104 is either "open" by virtue of relay 90 being non-operated or, if relay 90 is closed, that no voltage is applied to lead 104. Thus the +5 volts present at the other input of gate 62 causes the ONE to be passed to gate 64, and thence to gate 66. The clock signal produced by clock generator 50 is applied via inverter 56 to the other input of gate 66 causing logic ONE levels to be clocked out as regenerated half-bit pulses corresponding to the input bipolar half-bit MARK pulses with the noted delay as seen on line F of FIG. 2. Polarity control flip-flop 70 includes inverter 72 and flipflop 74. Flipflop 74 and flipflop 40 may be conveniently implemented as an SN7474 integrated circuit. The regenerated unipolar bit stream from gate 66 drives the CL input of flipflop 74 via inverter 72. The feedback connection from the Q-BAR output to the D input of flipflop 74 results in the signals as shown on line G from the Q output and on line H from the Q-BAR output.

These outputs from flipflop 74 are input to output driver 75 which may be an SN75452B dual peripheral NAND driver. The Q output connects to one input of gate 78 and the Q-BAR output connects to one input of gate 76, with the input signal of flipflop 74 being utilized as a gate control signal for gates 76 and 78. In response to this gating action, the sequential pulses from gates 76 and 78 therefore alternate between the base of transistor 73 and the base of transistor 71. By virtue of the push-pull connection of output transformer 82 to driver transistors 76 and 78, the current flow in primary winding halves of transformer 82 will cause currents in secondary winding 86. The summation of these currents produce the desired 50% duty cycle bipolar output signal as shown on line J of FIG. 2.

The peak pulse voltages of the output pulses are adjusted by selection of the value of the regulated voltage applied to the center tap of transformer winding 86.

As may now be seen, when relay 90 is unoperated, attenuated and distorted data signals appearing at the input of the RLAM will be regenerated and appear at the output of the RLAM without modification of the data content but fully regenerated and amplified to the desired peak pulse voltage. Due to the action of the 90° phase shift in generation of the clock signal and of the gating circuits, the output signal is delayed three-quarters of a bit as shown in FIG. 2. The RLAM can be tailored to operate with input signals with almost any amount of attenuation by proper selection of the comparator dc reference voltage determined by resistors 22 and 24.

As explained in the functional description when it is desired to delete certain incoming data and substitute locally generated data, relay 90 is closed via control circuits in the associated common electronics. Referring to FIG. 5, closing of relay contacts 91 through 94 connects leads 102 through 105 to the appropriate circuits in the common electronics. Lead 102 provides the regenerated undelayed unipolar version of the incoming signal to the delete data detector as shown in FIG. 3, lead 105 furnishes the clock signal to the common electronics, lead 103 connects to the insert data generator, and lead 104 connects to the insert control gate pulse generator. When the desired customer data byte to be deleted is located by the data detector, the substitute local data is generated. The clock on lead 105 is delayed in accordance with the invention and clocks out the substitute data onto lead 103 which is applied to gate 64. Simultaneously, the gating signal generated, which is equal in duration to the byte, is clocked out on lead 104. The signal is of the correct polarity and amplitude (low logic level) to inhibit gate 62 thereby blocking the incoming logic ONE level signals output from flipflop 40 and allowing the insert data byte to be passed to polarity control 70. At the end of the byte period, the gating signal ceases as the insert data byte is completed. Therefore, subsequent incoming data signals are again passed by gate 62 until the desired subscriber byte appears in subsequent frames, at which time the operation is repeated.

It is to be noted that relay 90 is closed only when leads 103 and 104 are open and maintained in a logic high condition from the +5 volt supply. After relay 90 is closed, leads 103 and 104 are switched to a logic low level (ground) during the period of a subscriber byte to be deleted and returned to high during the remainder of the frame period. In this manner, normal throughput of data is not disturbed by the operation of control relay 90.

In summary, it is seen that the RLAM advantageously receives, and outputs a regenerated version of distorted and attenuated incoming digital data signals without modification of content when no data is to be deleted or inserted. When deletion/insertion is desired, control relay 90 is operated without affecting the normal data throughput. The common electronics then recognizes the next frame containing the desired subscriber's data byte, generates a substitute data byte, and passes the substitute data byte to the output of the RLAM. It is important to recognize that the substitute data byte may have a different number of MARKs than the deleted byte and must not cause violations of the alternate positive and negative polarity rule for 50% duty cycle bipolar signals. The invention advantageously solves this problem by converting the incoming signals from bipolar to unipolar by means of data storage flipflop 40 and data gate 60. The inserted byte is also unipolar and therefore can be combined with the incoming data without concern. Polarity control flipflop 70 then causes consecutive MARKs of the combined incoming and inserted data to alternate polarities as required, thereby generating a proper bipolar output signal.

Figure 6:
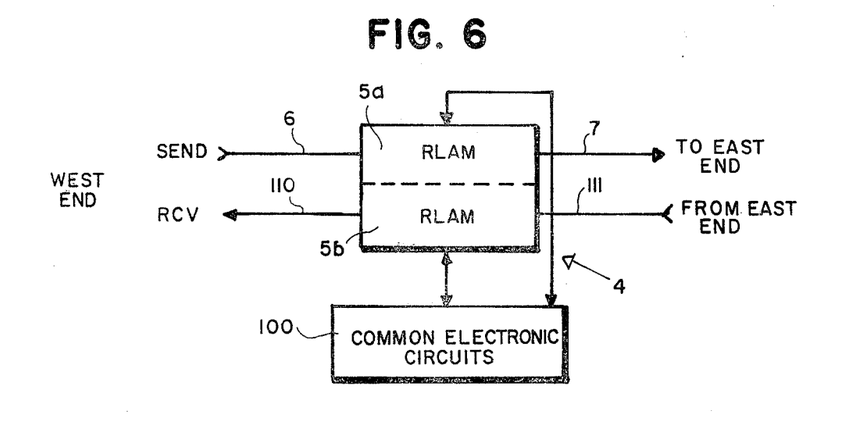
FIG. 6 is a simplified block diagram of a duplex RLAM connected in a duplex data transmission line.

In most applications for the RLAM, the data transmission system involves duplex transmission and there is both a send and receive transmission path. It is therefore common to provide a duplex RLAM composed of a single RLAM in each direction of the transmission system. FIG. 6 shows a duplex RLAM 4 consisting of two simplex RLAMs 5a and 5b controlled by a single common electronics 100. This configuration is particularly advantageous for testing individual subscriber channels. For example, assume that duplex RLAM 4 of FIG. 6 is connected in a data transmission line near the WEST end subscriber terminals. A selected subscriber channel is accessed by RLAM 5a and that subscriber's byte deleted. A special test code byte is inserted and transmitted to the EAST end, where the receive channel is patched to the send channel and the test code data retransmitted back to the WEST end. RLAM 5b therefore receives the data signals from the EAST end, accesses the selected subscriber byte at which point the common electronic circuits compare the received test byte with the transmitted test byte. Any problems at any point in the entire duplex transmission system that will produce errors in the received test data will be thus detected. In the event that a duplex RLAM is also installed at the EAST end in this example, the associated common electronics can be programmed to recognize the test codes and automatically perform the loop-back connection. It is to be recognized that the common electronics may include digital computers, microprocessors, and other logic circuits such that various automatic and semi-automatic testing programs can be provided including visual display and print-out facilities to permit rapid diagnosis of problems.

Thus, a primary application of the RLAM is for rapid and accurate automated testing of high density digital data transmission systems. A typical system is shown in block diagram form in FIG. 7. Here, a multiplicity of high speed data transmission lines are indicated with one of duplex RLAMs No. 1 through No. N connected in each transmission line. The RLAMs are all controlled by common electronics 100 which can be programmed to automatically scan and test selected subscriber channels periodically. Thus, thousands of channels can be rapidly and routinely monitored, and actual or incipient troubles located and identified, a procedure that is virtually impossible by prior art manual test procedures.

The RLAM is ideally suited for use in the monitoring and testing system disclosed in the Eddy et al U.S. Pat. No. 4,059,729 entitled "Method and System for Selectively Accessing Multiplexed Data Transmission Network for Monitoring and Testing of the Network," which patent is assigned to the assignee of the present invention. In particular, the RLAM is applicable to FIGS. 2 and 3 of the above-referenced patent.

In addition to the testing application of the RLAM, the use of a line access module allows convenient drop and insert of several subscriber channels at points in the system at which the use of a full multiplex-demultiplex equipment would be uneconomical. Two such uses are illustrated in FIGS. 8 and 9.

Figures 7, 8, 9:
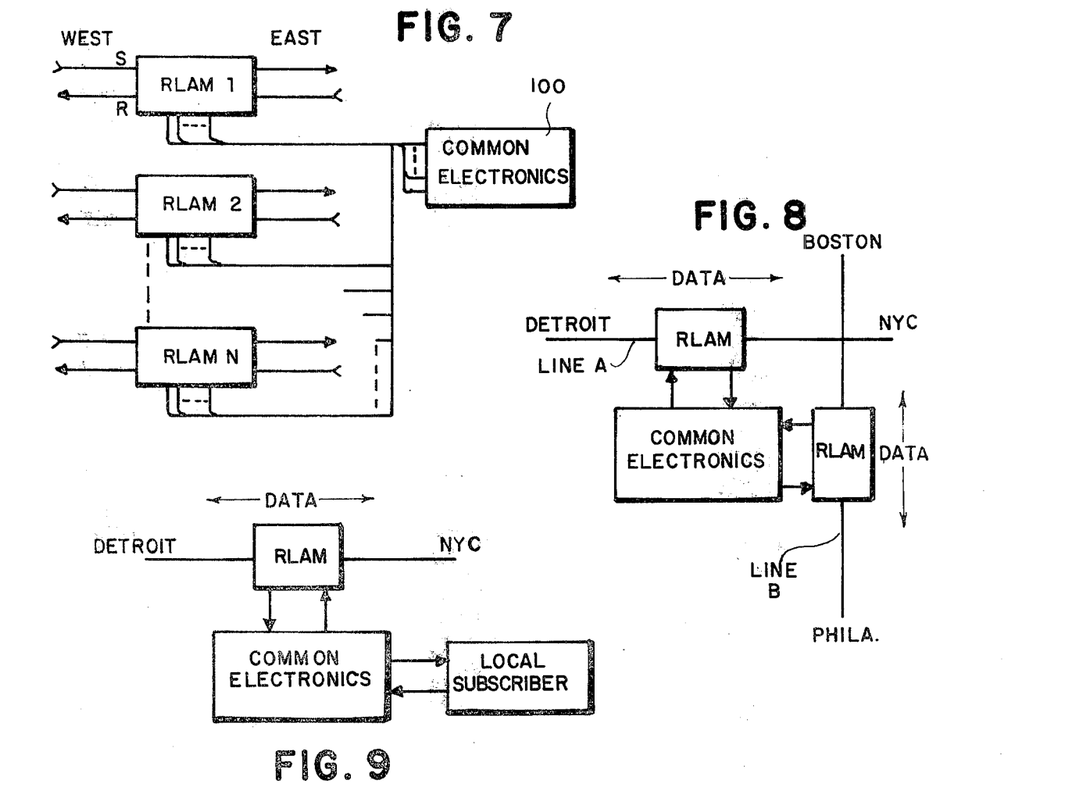
FIG. 7 is a simplified block diagram of N RLAMs installed in N duplex data transmission lines and controlled from one set of common electronics.
FIG. 8 is a simplified block diagram showing the use of RLAMs as a data transfer device.
FIG. 9 is a simplified block diagram showing the use of a RLAM for local subscriber access.

In FIG. 8, a block diagram is presented showing the RLAM used as a data transfer device. Segments of the data on transmission line A between New York City and Detroit can be transferred to transmission line B between Boston and Philadelphia, via the RLAMs associated with each line. The other application illustrated in FIG. 9 provides great flexibility at the local subscriber level by utilizing a RLAM to drop and insert a specific subscriber channel from the high speed line and distribute it to the subscriber loop without necessity of a full central office.

It will be clear to those skilled in the art that the embodiments described hereinabove are only exemplary, and that various modifications can be made in the construction and arrangement without departing from the scope of the invention.

I claim:

1. A line access module having input and output, and adapted to be connected in a series relationship to a digital data transmission line carrying a data pulse stream, said module comprising:

pulse regeneration means for receiving attenuated and distorted data signals at the input of said module, and for producing reshaped data signals at the output of said module, said pulse regeneration means comprising a dual comparator having a selectable reference threshold voltage;

timing extraction means electrically connected to and receiving signals from said pulse regeneration means, for producing a clock signal having a fundamental frequency equal to the fundamental frequency of the data pulse stream, said timing extraction means comprising means for filtering out a fundamental sinusoidal signal from the reshaped data pulses and shifting the phase of the filtered signal from the phase of the fundamental component of the reshaped data pulses, and square wave generation means responsive to the zero crossings of the filtered sinusoidal signal for producing said clock signal;

data gating means having two states, said data gating means electrically connected between said pulse regeneration means and said output of said module for passing the reshaped data signals to said output when said gating means is in the first of said states, and for blocking the reshaped data signals from reaching said output when said gating means is in the second of said states, said data gating means also connected to said timing extraction means to receive the clock signals therefrom; and relay means having contacts connected to said data gating means whereby operation of said relay means places said data gating means in said second state in response to externally-generated data signals and connects externally-generated data signals to said data gating means.

2. The line access module as defined in claim 1 in which said phase shift is 90°.

3. The line access module as defined in claim 1 in which:
said data gating means is arranged to receive said clock signal from said square wave generation means whereby the reshaped data signals passed by said data gating means when said gating means is in said first state are delayed due to said phase shift.

4. The line access module of claim 1 in which:
said selectable reference threshold voltage of said dual comparator is automatically selected to be proportional to the peak voltage of the attenuated data signals.

5. The line access module of claim 1 which further comprises:
input coupling means connected to said pulse regeneration means for providing push-pull data signals to said dual comparator and for terminating said transmission line in its characteristic impedance;
output driver means for amplifying the data signals to be output from said module; and
output coupling means for coupling the amplified data signals to said transmission line.

6. The line access module as defined in claim 5 in which:
said input coupling means includes a first transformer having a primary winding for connection to the transmission line and a center tapped secondary winding for connecting to said dual comparator, and a resistor equal in value to the reflected characteristic impedance of the transmission line and connected across said secondary winding;
said data gating means includes a flipflop for storage of the reshaped data pulses, a first gate for passing the reshaped data signals in its first state in response to a high logic signal and blocking the reshaped data signals in its second state in response to a low logic signal, a second gate connected to said first gate for inserting the externally-generated data signals when said first gate is in its second state, a third gate connected to said second gate for passing the reshaped data signals and the inserted data signals in response to said clock signals thereby delaying the reshaped data signals relative to the incoming data signals; and
said output coupling means includes a second transformer connected between said output driver means and said transmission line.

7. The line access module as defined in claim 1 in which said relay means includes contacts connected to said pulse regeneration means, to said gating means, and to said timing extraction means, said relay means being externally operable to connect the reshaped data signals to external data detector circuits, to connect said data gating means to gating pulse generation circuits for controlling said states of said gating means and to a source of externallygenerated data, and to connect said clock signals to said external control circuits.

8. A line access module for connection in a series relationship to a digital data transmission line carrying a data pulse stream in a 50 percent duty cycle bipolar format comprising:
pulse regeneration means for receiving attenuated and distorted bipolar data signals at an input of said module and producing reshaped first unipolar data signals;
timing extraction means electrically connected to said pulse regeneration means for producing a clock signal having a fundamental frequency equal to the fundamental frequency of the data pulse stream;
data gating means electrically connected to receive the reshaped first unipolar data signals form said pulse regeneration means for passing the first unipolar data signals when said gating means is in a first state, and for blocking the first unipolar data signals when said gating means is in a second state, said data gating means also connected to said timing extraction means to receive the clock signal therefrom;
data segment generation means connected to said data gating means for generating segments of second unipolar data signals to be inserted into said data pulse stream, said data gating means arranged to pass such second unipolar data signals when said data gating means is in the second state; and
polarity control means electrically connected to said data gating means for receiving the reshaped first unipolar data signals and the second unipolar data signals and for alternately reversing the polarity of successive unipolar pulses, thereby producing a composite bipolar data pulse stream consisting of a regenerated version of the attenuated and distorted bipolar data signals at the input of said module, and a bipolar version of the second unipolar data segments.

9. The line access module as defined in claim 8 in which said polarity control means comprises:
a flipflop for receiving the unipolar data signals at a data input of said flipflop;
a push-pull output driver circuit having a first-half connected to a Q output of said flipflop and a second half connected to a Q-BAR output of said flipflop; and
an output coupling circuit arranged to receive the push-pull outputs of said driver circuit and to couple said outputs to said transmission line;
whereby positive-going pulses are generated by said first-half of said driver circuit and negative-going pulses are produced by said second half of said driver circuit, and the positive-going and negative-going pulses combined to form a fifty percent duty cycle bipolar pulse stream by said output coupling circuit.

10. The line access module as defined in claim 9 in which:
said push-pull output driver circuit includes a first gate having its output connected to a first transistor power amplifier, and a second gate having its output connected to a second transistor power amplifier in which one input of said first gate is the input of said first-half and and one input of said second gate is the input to said second-half, and said first and second gates are controlled to alternately pass the unipolar data signal pulses.

11. A device installable in a series relationship in a transmission line carrying a digital time division multiplexed data bit stream for accessing individual subscriber channels within the bit stream comprising:
regeneration means for reshaping pulses of the incoming data bit stream;
timing means for generating clock signals in synchronism with the incoming data bit stream;
location means for receiving the reshaped data from said regeneration means for determining the location of the incoming data bit stream of a selected subscriber data segment;

delay means connected to said regeneration means and to said timing means for providing a selected delay to reshaped pulses from said regeneration means, said delay means comprising flipflop means controlled by said timing means for temporarily storing such reshaped pulses, and data gating means for passing the reshaped data to the outgoing transmission line when in an unblocked state and for blocking the reshaped data from the outgoing transmission line when in a blocked state; and control means connected to said location means and said gating means, said control means responsive to said location means to place said gating means in the blocked state during the period of a selected subscriber data segment and controlling said gating means to pass a substitute data segment to said outgoing transmission line during such period.

12. A device as defined in claim 11 which further comprises an additional, identical device installable in a second transmission line, said device arranged to transmit such substitute segment over said outgoing transmission line to a distant terminal with said segment returnable by said second transmission line to said additional device and accessible by said additional device for testing the transmission system formed by said outgoing transmission line, said distant terminal and said second transmission line.

* * * * *